July 20, 1948.  J. J. ROOT  2,445,408

REACTOR

Filed July 6, 1945

INVENTOR.
John J. Root
BY
S. Stephen Baker
ATTORNEY

Patented July 20, 1948

2,445,408

UNITED STATES PATENT OFFICE 2,445,408

REACTOR

John J. Root, New York, N. Y.

Application July 6, 1945, Serial No. 603,567

5 Claims. (Cl. 171—242(777))

My invention relates to reactors and more particularly to reactors or choke coils such as are used in fluorescent lighting circuits.

The function of reactors in such circuits is well known, the reactor first causing an "inductive kick" which supplies a momentary voltage high enough to start the lamp and thereafter limiting the arc current after the discharge has started. Air gaps are conventionally formed in the cores of such reactors in order to avoid saturation under operating conditions, and to stabilize the inductance of the reaction.

The inherent chattering or humming of these reactors is well known and much effort has been directed toward its elimination. Most of this effort has taken the form of rubber mountings or similar devices, the functions of which are to absorb the vibrations which cause the noise. Other expedients are the use of channels or metallic mounting frames of such mechanical strength as to prevent vibration of the reactor elements. In spite of these precautions, however, the hum is often disconcerting and usually increases as the mountings or channels become loosened with the passage of time. As a result, it is often advisable to resort to special installation procedures so as to locate such reactors in attics, basements or in soundproof rooms.

Bearing the foregoing in mind, it is an object of the present invention to reduce or eliminate the hum or chattering noises which are characteristic of these reactors.

Another object of this invention is to lower present requirements of rigid mechanical bonding for the reduction of such noise so that such precautions heretofore considered essential may be relaxed without impairing the quiet operation of these reactors.

Other objects of my invention will be apparent from the following description, it being understood that the above general statements of the objects of my invention are intended to describe and not to limit it in any manner.

Referring to the drawings.

Figure 2:
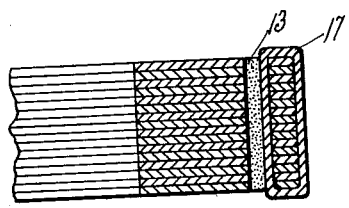
Fig. 2 is a section along the line 2—2 of Fig. 1.

The reactor comprises the usual framework which is illustrated as being a core 10 of the closed type. As will appear hereinafter, however, the improvement is applicable as well to shell cores or other core types. The core 10 is laminated according to conventional practice as shown in Fig. 2.

The core legs 11 and 12 are provided with the usual gaps in order to keep the flux density down below the saturation value for the core. These gaps, which represent areas of low permeability, are conventionally provided with fiber, paper, or plastic spacers 13 of non-magnetic material so as to offer a high reluctance to the magnetic lines of force. A coil 14 is wound around the core 10 for generating flux when carrying electric current.

Figure 1:
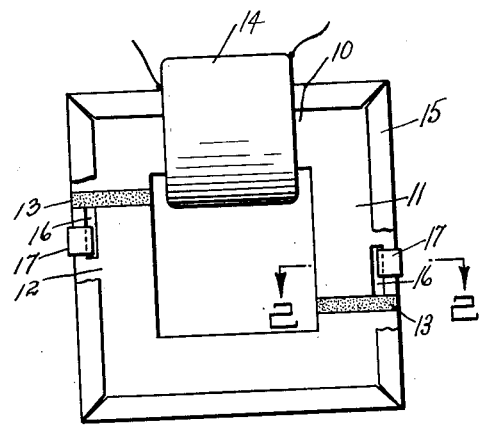
Fig. 1 is a plan view of a reactor constructed according to the present invention.

In order to maintain the reactor assembled, bonding means in the form of a channeled mounting frame 15 is employed. The frame 15 is broken away in Fig. 1 to illustrate the improvement incorporated in the reactor as set forth hereinafter. As an alternative assembly method, ordinary brass screws through the core elements may be employed.

The above construction represents a typical reactor device such as may be used in fluorescent lighting circuits. Its tendency to chatter is well known as has been noted above. I have determined that this chatter is largely attributable to the fact that the gaps or low permeability areas 13 tend to form pole faces on either side thereof with a consequent attraction between them. Since the flux is in the form of an alternating field, this attraction is periodically relaxed as the flux is zero. The plastic or fiber spaces in the air gaps are thus subjected to periodic compression and relaxation so that they tend to expand to their normal state after each compression. The result of this resilient spacer action is to vibrate the core at these low permeability areas 13 which vibrations are of course transmitted to the entire core against the bonding action of the mounting frames 15.

Thus the mounting frame 15, or mounting screws if they are used, is subjected to periodic strains due to the action above outlined. As a result, even if the mounting frame is carefully and firmly applied when the reactor is new, these strains usually succeed in loosening the mounting means and causing additional vibration.

In order to reduce these vibrations at their source, I provide slots 16 through the laminations adjacent the areas 13 so as to form forks with two branches, the branches being of different widths and of correspondingly different magnetic permeability. A short circuited winding 17 is then disposed in the slot 16 in order to embrace a complete stack of laminations the width of the reactor around the branch of lesser permeability. This short circuited winding 17 is disposed so as to have its axis parallel to the laminations of the reactor and is illustrated as a single turn of flat copper stock although it may take the form of a winding having many turns.

Those skilled in the art will comprehend the function of the short circuited winding 17. Briefly, it introduces a secondary flux which combines with the flux of the main winding 14 so as to prevent a zero flux pull at the site of the low permeability areas 13. Thus the core does not vibrate and strain against the confining action of the frame 15. This result is due to the fact that the spacers in the air gaps are not subjected to the degree of compression as in present reactors and no vibrating action is transmitted to the core. Accordingly, extreme or elaborate bonding or installation methods are not required and manufacturing economies may be realized while providing a superior reactor.

I have shown a preferred embodiment of my invention but it is obvious that numerous changes and omissions may be made without departing from its spirit.

I claim:

1. A laminated core reactor comprising core legs, bonding means for maintaining the assembly of the reactor, a plurality of areas of low permeability disposed transversely in said laminated core, means to prevent chattering of said core against the action of said bonding means, said chattering prevention means comprising short circuited coils disposed in and encircling slots formed in said core adjacent and extending into said areas, said slots being formed entirely through said laminations, whereby each of said coils embraces a stack of laminations the width of said reactor where said laminations abut said areas of low permeability, one of said slots being formed in each core leg and parallel to the longitudinal axis thereof.

2. A reactor according to claim 1 wherein said short circuited coils each comprise single, flat turns of copper.

3. A laminated core reactor comprising core legs, bonding means for maintaining the assembly of the reactor, a section of non-magnetic material disposed transversely in said laminated core so as to form an area of low permeability whereby fixed core sections of said reactor are separated by said section of non-magnetic material, means to prevent chattering of said core against the action of said bonding means, said chattering prevention means comprising a short circuited coil disposed in and encircling a longitudinal slot formed in a core leg and adjacent and extending into said area, said slot being formed parallel to the longitudinal axis of the core leg in which it is formed.

4. A laminated core reactor according to claim 3 wherein said non-magnetic material is resilient relative to the material of said core.

5. A laminated core reactor comprising an exciting winding, core legs on each side of said winding, core sections connecting said legs together physically so as to form an endless structure, each of said legs being forked at a transverse line thereof so as to form two branches of mutually different magnetic permeability, a spacer of resilient material adjacent each of said forked transverse lines and magnetically interrupting each core leg, and means to prevent chattering of the laminated core so as to avoid vibratory action of said spacers, said means comprising a short-circuited coil disposed around the branch of each fork having the lesser magnetic permeability.

JOHN J. ROOT.

REFERENCES CITED

The following references are of record in the file of this patent:

UNITED STATES PATENTS

| Number | Name | Date |
|---|---|---|
| 1,934,526 | Deuser et al. | Nov. 7, 1933 |

FOREIGN PATENTS

| Number | Country | Date |
|---|---|---|
| 557,997 | France | May 15, 1923 |